(12) United States Patent
Tsujimori et al.

(10) Patent No.: US 7,039,905 B1
(45) Date of Patent: May 2, 2006

(54) COMPILER DEVICE AND COMPUTER-READABLE RECORDING MEDIUM RECORDED WITH COMPILER PROGRAM

(75) Inventors: Yuji Tsujimori, Kawasaki (JP); Hitoshi Owaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 458 days.

(21) Appl. No.: 09/625,891

(22) Filed: Jul. 26, 2000

(30) Foreign Application Priority Data

Nov. 10, 1999 (JP) .................................. 11-319570

(51) Int. Cl.
*G06F 9/45* (2006.01)

(52) U.S. Cl. ....................... 717/149; 717/140; 717/150

(58) Field of Classification Search ................ 717/153, 717/124–128, 136, 139–140, 145, 148–150; 711/147
See application file for complete search history.

(56) References Cited

U.S. PATENT DOCUMENTS

| | | | | |
|---|---|---|---|---|
| 5,237,691 A | * | 8/1993 | Robinson et al. ........... 717/107 |
| 5,381,550 A | * | 1/1995 | Jourdenais et al. ......... 717/149 |
| 5,437,034 A | * | 7/1995 | Tanaka et al. .............. 717/160 |
| 5,511,192 A | | 4/1996 | Shirakihara |
| 5,535,393 A | * | 7/1996 | Reeve et al. ................ 717/149 |
| 5,655,101 A | * | 8/1997 | O'Farrell et al. .......... 711/148 |
| 6,179,489 B1 | * | 1/2001 | So et al. ..................... 718/102 |
| 6,209,066 B1 | * | 3/2001 | Holzle et al. .............. 711/153 |
| 6,253,371 B1 | * | 6/2001 | Iwasawa et al. ............ 717/150 |
| 6,289,334 B1 | * | 9/2001 | Reiner et al. ................... 707/3 |
| 6,298,370 B1 | * | 10/2001 | Tang et al. ................. 718/102 |
| 6,314,563 B1 | * | 11/2001 | Agesen et al. ............. 717/108 |
| 6,463,582 B1 | * | 10/2002 | Lethin et al. .............. 717/158 |
| 6,725,448 B1 | * | 4/2004 | Moriya et al. ............. 717/119 |
| 6,735,763 B1 | * | 5/2004 | Enokida ..................... 717/143 |
| 6,789,181 B1 | * | 9/2004 | Yates et al. .................... 712/4 |
| 6,789,253 B1 | * | 9/2004 | Streich et al. ............. 717/138 |
| 6,934,832 B1 | * | 8/2005 | Van Dyke et al. ......... 712/244 |

FOREIGN PATENT DOCUMENTS

JP 5-204656 8/1993

OTHER PUBLICATIONS

"C: The Complete Reference, Third Edition" by Herbert Schildt, 1995.*
"Microsoft Computer Dictionary: Fifth Edition", Microsoft Press, 2002. p. 354.*
"Java Threads, 2nd Edition", by Scott Oaks et al., O'Reilly & Associates, 1999, Section 10.1:Thread Group Concepts.*
Severance et al, Comapring gand scheduling with dynamic space sharing on symmetric multiprocessor uing auotmatic self allocating threads (ASAT), IEEE, pp 288-292, 1997.*
Shimoo et al, "A new parallel processing paradigm using a recon gurable computing system", IEEE, ISCIT pp 797-800, 2004.*
Wolf et al, "Design and programming of embadded multiprocessors an interface centric approach", ACM Codes, pp 206-217, 2004.*
Ang et al, "Compile/run time support for threaded MPI execuation on multiprogrammed shared memory machines", ACM PPOPP, pp 107-118, 1999.*

* cited by examiner

*Primary Examiner*—Anil Khatri
(74) *Attorney, Agent, or Firm*—Greer, Burns, & Crain, Ltd.

(57) ABSTRACT

A compiler device and a computer-readable recording medium recorded with a compiler program, adapted to generate a code for performing a procedure call in a program, making use of a dynamically and thread-piece-wise allocated interface area when a plurality of threads are processed in parallel.

9 Claims, 8 Drawing Sheets

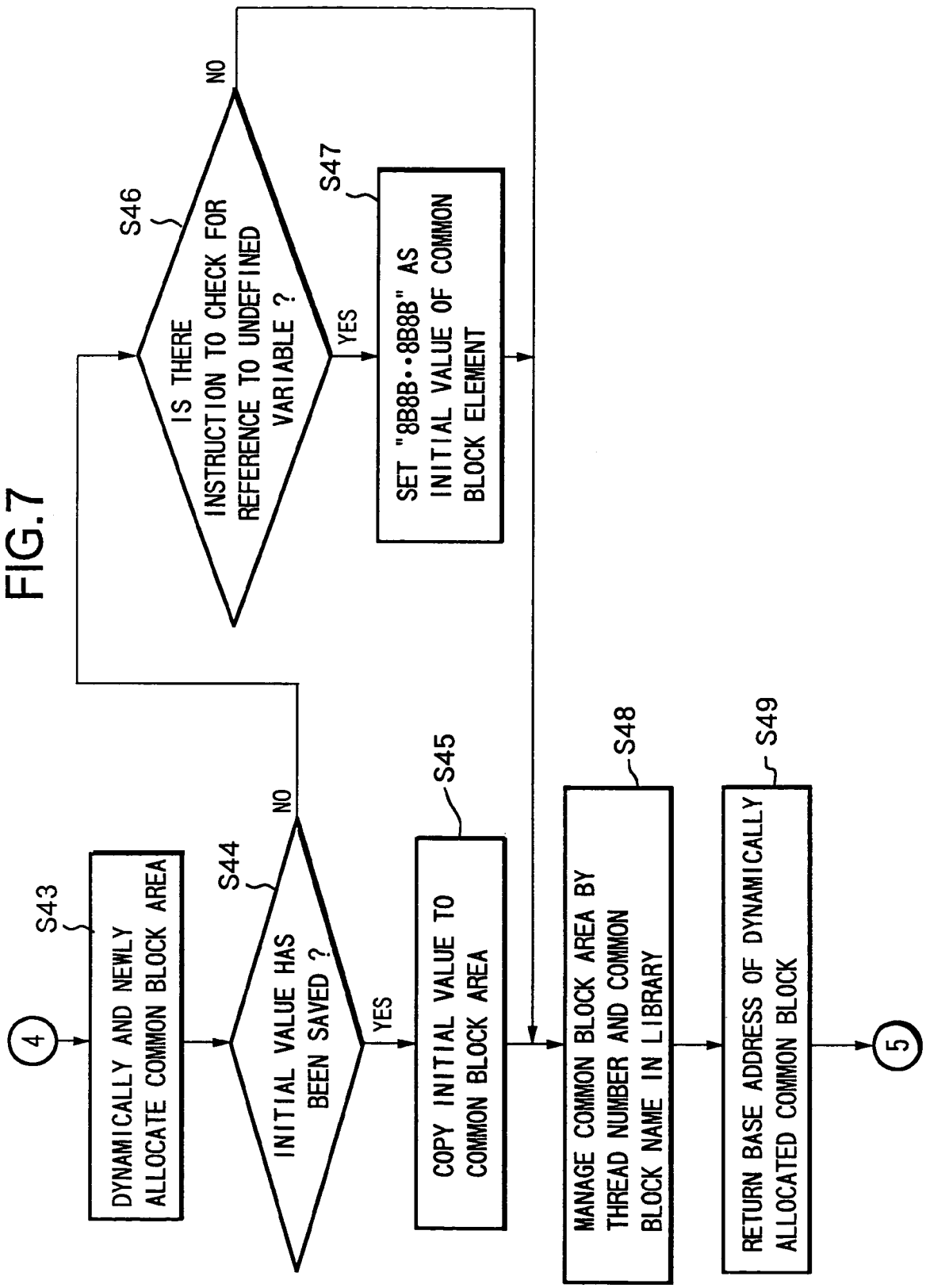

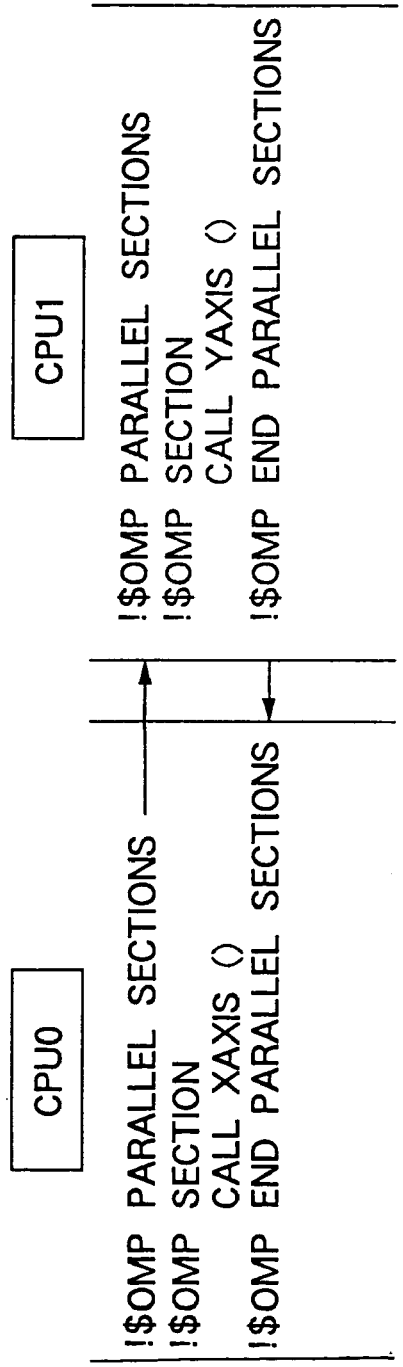

COMPILER DEVICE AND COMPUTER-READABLE RECORDING MEDIUM RECORDED WITH COMPILER PROGRAM

FIELD OF THE INVENTION

The present invention relates to a compiler technique for compiling a source program, and particularly to a technique for realizing a procedure call utilizing an interface area in a parallel processing.

RELATED ART OF THE INVENTION

Conventional methods for interfacing between procedures in a program include those which pass arguments, use an interface area, and use an external file. Herein, the term "interface area" refers to a common block area and an external variable area allocated by using such commands as the "COMMON statement" in FORTRAN and the "extern statement" in C and C++, respectively.

There will be now considered a situation as a concrete example where a main routine and a subroutine are interfaced with each other by using the "COMMON statement" in FORTRAN. When a block name, for which the COMMON declaration is made in the main routine, is similarly declared in the subroutine, a value set in the main routine is allowed to be referred to in the subroutine and a value set in the subroutine is allowed to be referred to in the main routine.

However, it has been conventionally assumed that the "COMMON statement" is to be executed in a serial processing, so that one common area has been statically allocated for each executable program unit. As such, there is a possibility of occurrence of a problem as follows, when the "COMMON statement" is directly applied to a parallel processing.

Namely, when two subroutines are called from a main routine and these subroutines are simultaneously processed in parallel by different CPU's, respectively, such that a value in an interface area is updated in either of the subroutines, the value held in the interface area may become indefinite depending on a difference between execution timings of the subroutines. In this situation, operation results are not necessarily identical even when input data are identical, resulting in low reliability of the program, so that the "COMMON statement" has not been practically used in the parallel processing.

Further, similar problems have been found even in the "extern statement" in C and C++.

SUMMARY OF THE INVENTION

The present invention has been carried out in view of the conventional problems as described above, and it is therefore an object of the present invention to provide a compiler technique for realizing a procedure call using an interface area in a parallel processing by dynamically and thread-piece-wise allocating a common area.

It is another object of the present invention to distribute a recording medium recorded with the compiler program according to the present invention, so that those who have obtained such a recording medium can easily constitute a compiler device.

To achieve the above objects, the present invention provides as a first solving means, a compiler device to generate a code for performing a procedure call in a program, making use of a dynamically and thread-piece-wise allocated interface area when a plurality of threads are processed in parallel.

Herein, the term "interface area" refers to a common block area and external variable area allocated by using commands such as the "COMMON statement" in FORTRAN and the "extern statement" in C and C++, respectively. Making use of such a common block area or an external variable area, procedures in a program are interfaced with each other.

According to such a constitution, when executing the program, there is performed a procedure call in a program, making use of a dynamically and thread-piece-wise allocated interface area. Thus, even when a plurality of threads are to be processed in parallel, the thread-piece-wise interface areas are independent of each other so that the threads will never interfere with each other. As a result, there can be realized a procedure call using an interface area in a parallel processing, which was impossible in the conventional technique.

The present invention provides as a second solving means, a compiler device comprising: code generating means for generating a code for determining a leading address of a dynamically and thread-piece-wise allocated interface area; and code converting means for converting a reference to the interface area in a source program into a code for a performing a reference making use of the leading address determined by executing the code generated by the code generating means.

According to such a constitution, there is generated a code for determining a leading address of a dynamically and thread-piece-wise allocated interface area; and a reference to the interface area in a source program, is converted into a code for performing a reference making use of the leading address determined by executing the generated code. Thus, even when a plurality of threads are to be processed in parallel, the respective thread-piece-wise interface areas are independent of each other so that the threads will never interfere with each other. As a result, there can be realized a procedure call using an interface area in a parallel processing, which was impossible in the conventional technique.

The code generating means is preferably constituted to generate a code for calling a library for determining the leading address of the dynamically and thread-piece-wise allocated interface area.

Here, the term "library" refers to a group of standardized routines and subroutines, and includes a Dynamic Linked Library to be dynamically called when executing a program or a Static Library to be linked to an object program by a linker.

According to such a constitution, a leading address of a dynamically and thread-piece-wise allocated interface area is determined by executing a code for calling a library. Thus, it becomes unnecessary to describe, in a source program, a processing for determining a leading address of an interface area, to thereby simplify a program structure.

Further, the code generating means is preferably constituted to generate a code for determining the leading address of the interface area, based on a designation by a user.

According to such a constitution, when the user intends to avoid performing a parallel processing for a specific processing, a code for parallelizing the specific processing is not generated, by specifying the user's intention. Thus, there can be provided a flexible program structure conforming to the user's intention.

The present invention provides as a third solving means, a computer-readable recording medium recorded with a compiler program for causing a computer to realize a function to generate a code for performing a procedure call in a program, making use of a dynamically and thread-piece-wise allocated interface area when a plurality of threads are processed in parallel.

Here, the term "recording medium" refers to what is capable of assuredly recording various information which can be taken out therefrom as required, and includes a computer-readable recording medium such as a magnetic tape, magnetic disk, magnetic drum, IC card and CD-ROM.

According to such a constitution, the computer-readable recording medium is recorded with a compiler program for realizing a function to generate a code for performing a procedure call in a program when executing the program, making use of a dynamically and thread-piece-wise allocated interface area. Thus, upon obtaining such a recording medium recorded with the compiler program, it becomes possible to easily constitute a compiler device according to the present invention, making use of a general computer system.

The present invention provides as a fourth solving means, a computer-readable recording medium recorded with a compiler program for causing a computer to realize a code generating function for generating a code for determining a leading address of a dynamically and thread-piece-wise allocated interface area, and a code converting function for converting a reference to the interface area in a source program into a code for performing a reference making use of the leading address determined by executing the code generated by the code generating function.

According to such a constitution, the computer-readable recording medium is recorded with the compiler program for realizing the code generating function and the code converting function. Thus, upon obtaining such a recording medium recorded with the compiler program, it becomes possible to easily constitute a compiler device according to the present invention, making use of a general computer system.

The code generating function is preferably constituted to generate a code for calling a library for determining the leading address of the dynamically and thread-piece-wise allocated interface area.

According to such a constitution, a leading address of a dynamically and thread-piece-wise allocated interface area is determined by executing a code for calling a library. Thus, it becomes unnecessary to describe, in a source program, a processing for determining a leading address of an interface area, to thereby simplify a program structure.

Further, the code generating function is preferably constituted to generate a code for determining a leading address of an interface area, based on a designation by a user.

According to such a constitution, when the user intends to avoid performing a parallel processing for a specific processing, a code for parallelizing the specific processing is not generated, by specifying the user's intention. Thus, there can be provided a flexible program structure conforming to the user's intention.

Further objects and aspects of the present invention will become more apparent from the following description of the preferred embodiment when read in conjunction with the accompanying drawings.

BRIEF EXPLANATION OF THE DRAWINGS

FIG. 7 is a further continued flowchart showing the processing contents in the library; and FIG. 8 is a schematic diagram of a task parallel processing, in which (A) shows a source program for a serial processing, (B) shows a source program for a parallel processing, and (C) shows procedures to be executed by respective CPU's.

PREFERRED EMBODIMENT

The present invention will be described hereinafter with reference to the accompanying drawings.

Before describing an embodiment of the present invention, there will be firstly explained problems of the prior art and an outline of the present invention, so as to expedite comprehension of the details of the present invention.

FIG. 8 shows a scheme for processing in parallel a plurality of procedures (subroutines XAXIS and YAXIS), assuming that OpenMP is to be used on FORTRAN. Namely, a source program for a serial processing such as shown in FIG. 8(A) is rewritten into another source program for a parallel processing such as shown in FIG. 8(B). In this case, the "!$OMP" in the latter source program is a statement capable of controlling a switching between valid/invalid of the line thereof, by duly setting a compiler option. Further, the rewritten source program is designated as a parallel processing by the "SECTION" statement described in an area surrounded by "PARALLEL SECTIONS" and "END PARALLEL SECTIONS".

When such a rewritten source program is executed, the subroutines XAXIS and YAXIS are called from the main routines in CPU 0 and CPU 1, respectively, as shown in FIG. 8(C). Further, there is considered a situation where there is used variable "a" allocated in a static area for on per program unit by the COMMON statement, as an interface between the main routine and the subroutine XAXIS and YAXIS. In this situation, one variable "a" per program unit is allocated in the static area. As such, the subroutines XAXIS and YAXIS are obliged to use one variable "a" allocated in the common static area. As a result, when a numeric value of the variable "a" is updated after the variable "a" is referred to in the subroutines XAXIS and YAXIS, before the numeric value set to the variable "a" is processed by one of the subroutines, the value may be updated by the other of the subroutines depending on the processing timing of CPU's, leading to a possibility that those operation results in the respective subroutines differ from the values expected by a user. Thus, in the conventional technique, the operation results obtained by the respective subroutines are rendered to be undefined, so that the source program has not been able to deal with a parallel processing.

As such, according to the present invention, one area is dynamically and thread-piece-wise allocated by means of the COMMON statement, i.e., one area is thread-piece-wise privatized, thereby capable of dealing with a parallel processing.

Figure 1:
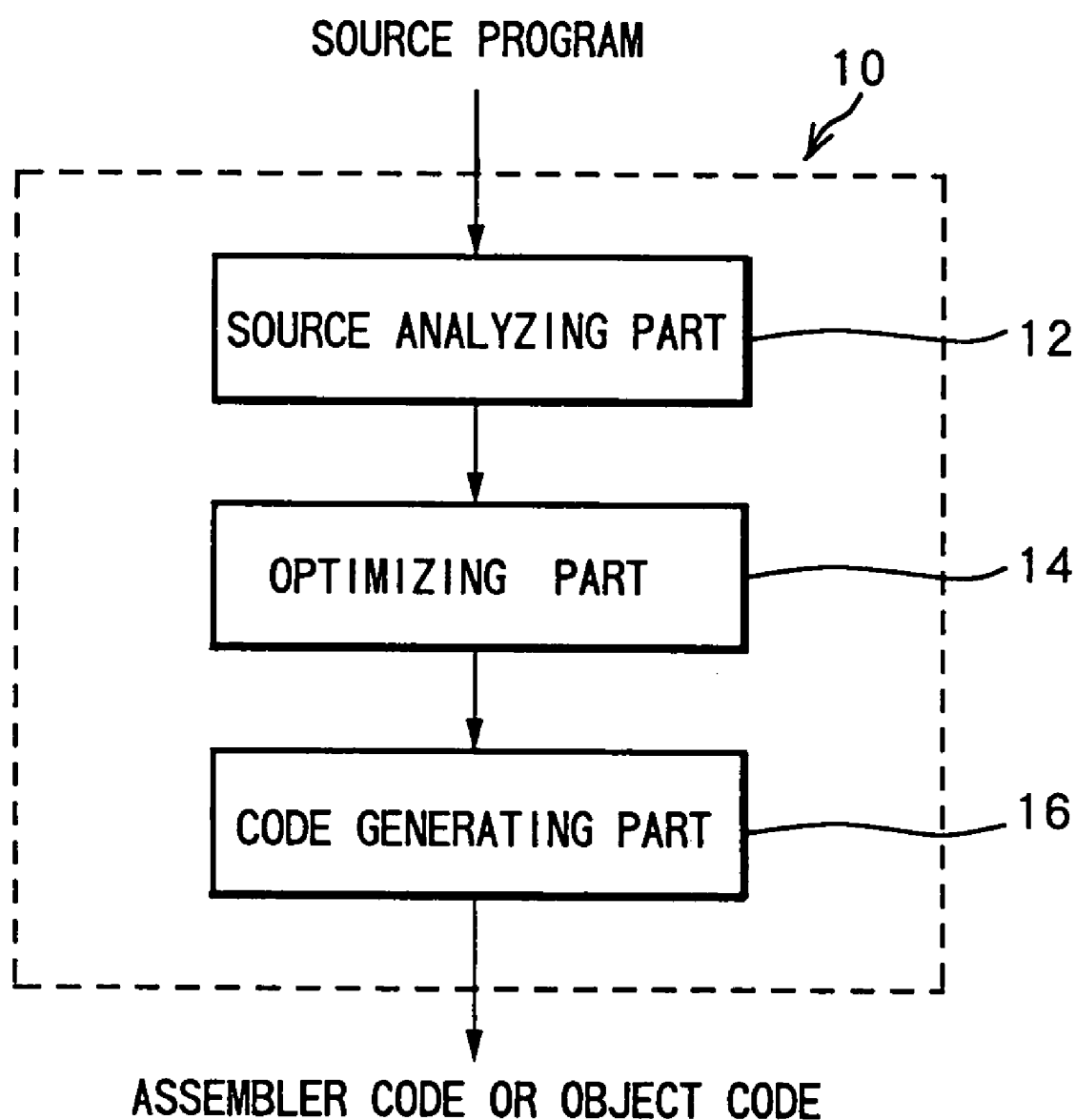
FIG. 1 is a constitutional view of a compiler device according to the present invention.

There will be described hereinafter a constitution of a compiler device according to the present invention (hereinafter merely called "compiler device"), with reference to FIG. 1.

A compiler device 10 is constituted to include a source analyzing part 12, an optimizing part 14 and a code generating part 16. The source analyzing part 12 provides a function to analyze a source program to thereby generate an intermediate language, and realizes a measure to deal with a parallel processing by means of a processing to be described later. The optimizing part 14 provides a function for performing an optimization such as to shorten a processing time for the intermediate language generated by the source analyzing part 12. The code generating part 16 provides a function to read the intermediate language optimized by the optimizing part 14, and to output an assembler code or an object code. Here, when an assembler code is output by the code generating part 16, it is necessary to compile the assembler code into an object code by an assembler compiler. Then, the object codes, output by the code generating part 16 or compiled by the assembler compiler, are bound with each other by a linker (not shown in the figure) to complete an executable program.

The compiler device 10 is constructed on a computer provided with at least a memory and a central processing unit (CPU), such that the compile processing is performed in accordance with a program loaded into the memory.

Figure 2:
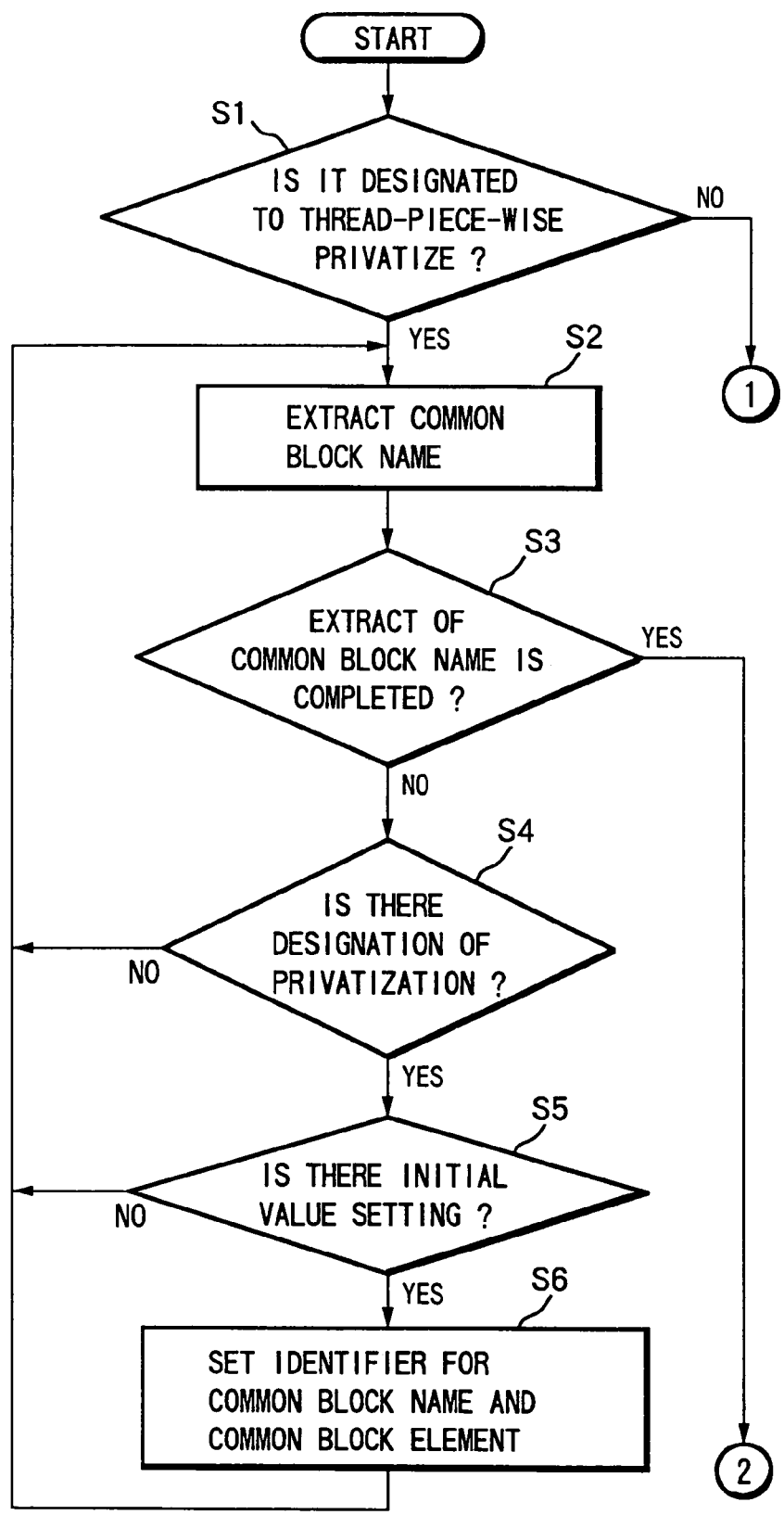
FIG. 2 is a flowchart showing processing contents for realizing a parallel processing by a source analyzing part.
Figure 3:
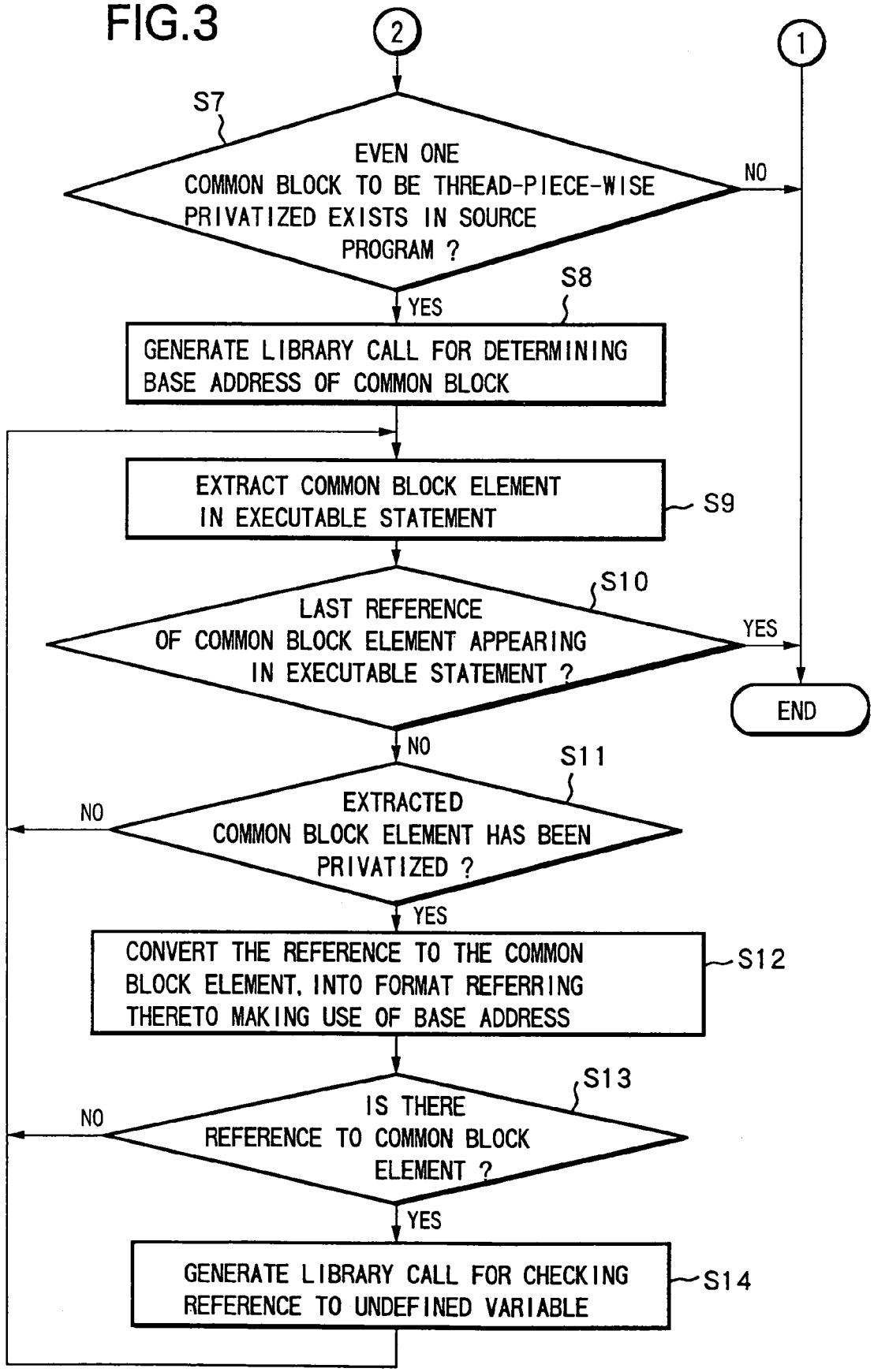
FIG. 3 is a continued flowchart showing the processing contents for realizing the parallel processing by the source analyzing part.

FIGS. 2 and 3 cooperatively show a flowchart of a compile processing to be performed at the source analyzing part 12 of the compiler device 10.

At step 1 (abbreviated to "S1" in the drawings, and the same rule applies correspondingly to the following), it is judged whether or not it is designated to thread-piece-wise privatize a common block allocated by the COMMON statement, such as by a compiler option. The flow advances to step 2 (Yes) if it is designated to thread-piece-wise privatize the common block, while the processing is terminated (No) if it is not designated so.

At step 2, there is extracted the common block name declared by the COMMON statement, from the source program. Here, when a common block name is not extracted from the source program, concretely, when the extract of the common block name has been completed, there is taken out such as an identifier indicative of the completion.

At step 3, it is judged whether or not the extract of the common block names is completed, based on the extracted common block name. The flow advances to step 7 (Yes) if the extract of the common block name is completed, while advances to step 4 (No) if it is not completed.

At step 4, it is judged whether or not there is a designation to thread-piece-wise privatize the common block specified by the extracted common block name. The flow advances to step 5 (Yes) if there is the designation of privatization, while goes back to step 2 (No) if there is not the designation.

At step 5, it is judged whether or not there is an initial value setting for the common block, such as based on the presence or absence of the DATA statement. The flow advances to step 6 (Yes) if there is the initial value setting, while goes back to step 2 (No) if there is not an initial value setting.

At step 6, an identifier (such as "_") for judging whether the initial value exists at the time of execution, is added to the common block name designated by a user, to thereby generate a common block having a common block name added with the identifier. Further, there is set an identifier (such as '###-Include initialized values-###') indicative of existence of the initial value, for such as a variable of the common block (hereinafter called "common block element"). Thereafter, the flow goes back to step 2.

Here, when the source program is:
common/common_block_name__1/var1
common/common_block_name__2/var2
data var2/10/ there is generated the following code by the processing at the step 6:
common/common_block_name__1/var1
common/common_block_name__2/var2
data var2/10/
common/_common_block_name__1/var1_generate
common/_common_block_name__2/var2_generate
character*35 var1_generate, var2_generate
data var2_generate/'###-Include initialized values-###'/

According to the processing of steps 1 through 6 as described above, there is added an identifier indicative of existence of an initial value, to the common block name having the designation of privatization and the initial value setting. Further, for the common block element of the common block, there is set an identifier indicating that an initial value is set. In this way, it becomes possible to set a dynamic initial value for a dynamically allocated common block, by the execution of the processing to be described later.

At step 7, it is judged whether or not even one common block to be thread-piece-wise privatized exists in the source program. The flow advances to step 8 (Yes) if a common block to be privatized exists, while the processing is terminated (No) if such a common block does not exist.

At step 8, there is generated, at an entrance of the source program, a library call for determining a base address (leading address) of the common block to be referred to by the source program. Namely, there is dynamically and thread-piece-wise allocated a common block, so that the code is converted so as to access to such as a variable based on the base address returned from the library. For example, the library call is as follows:
Call Fortran_lib('common_block_name__1',
 length('common_block_name__1'),
 var1_generate,
 &var1,
 size(var1),
 &base_of_common_block_name__1)
wherein "common_block_name__1" is the common block name, "length('common_block_name__1')" is a length of the common block name, "var1_generate" is an initial value flag, "&var1" is the leading address of the common block, "size(var1)" is a size of the common block, and "&base_of_common_block_name__1" is the base address for accessing to the common block returned from the library.

The processing of step 8 corresponds to code generating means and a code generating function for determining a leading address of an interface area.

At step 9, there is extracted, from the source program, a reference in an executable statement referring to the common block element.

At step 10, it is judged whether or not the extracted common block element is the last reference in the source program. The processing is terminated if the common block element is the last reference (Yes), and the flow advances to a step 11 (No) if it is not the last.

At step 11, it is judged whether or not the extracted common block element is the one which has been thread-piece-wise privatized. The flow advances to step 12 (Yes) if it is the privatized common block element, while the flow goes back to the step 9 (No) if it is not the privatized common block element.

At step 12, the reference to the common block element is converted into a format which refers to the common block element making use of the base address determined by the library. When a user program is:

COMMON/COM/COM_VAR
COM_VAR=1 the reference to the common block element making use of the base address is converted making use of the library call, into:

call Fortran_lib( . . . , &base)
base->VAR=1 wherein the mark "->" represents a pointer operation.

The processing at step 12 corresponds to code converting means and a code converting function.

At step 13, it is judged whether or not there is a reference to the common block element, such as an executable statement "X=VAR". The flow advances to step 14 (Yes) if there is a reference to a value of the common block element, while the flow goes back to the step 9 (No) if there is not a reference to a value of the common block element.

At step 14, there is generated a library call for checking a reference to an undefined variable. Namely, the library checks whether an undefined value is referred to, and if an undefined variable is referred to at the time of program execution, an error message is displayed. The flow thereafter goes back to step 9.

According to the processing at steps 7 through 14 as described above, there is generated a code for allowing an access to the common block area dynamically and thread-piece-wise allocated by the COMMON statement at the time of program execution. Namely, an access to the common block to be thread-piece-wise privatized is rendered to be performed based on the base address determined by the library. Further, in case of a reference to a value of the common block element, there is conducted the checking of a reference to an undefined variable, to thereby allow improvement of the reliability of the program.

FIGS. 4 through 7 show flowcharts to be conducted before execution of a user program (hereinafter merely called "program").

Figure 4:
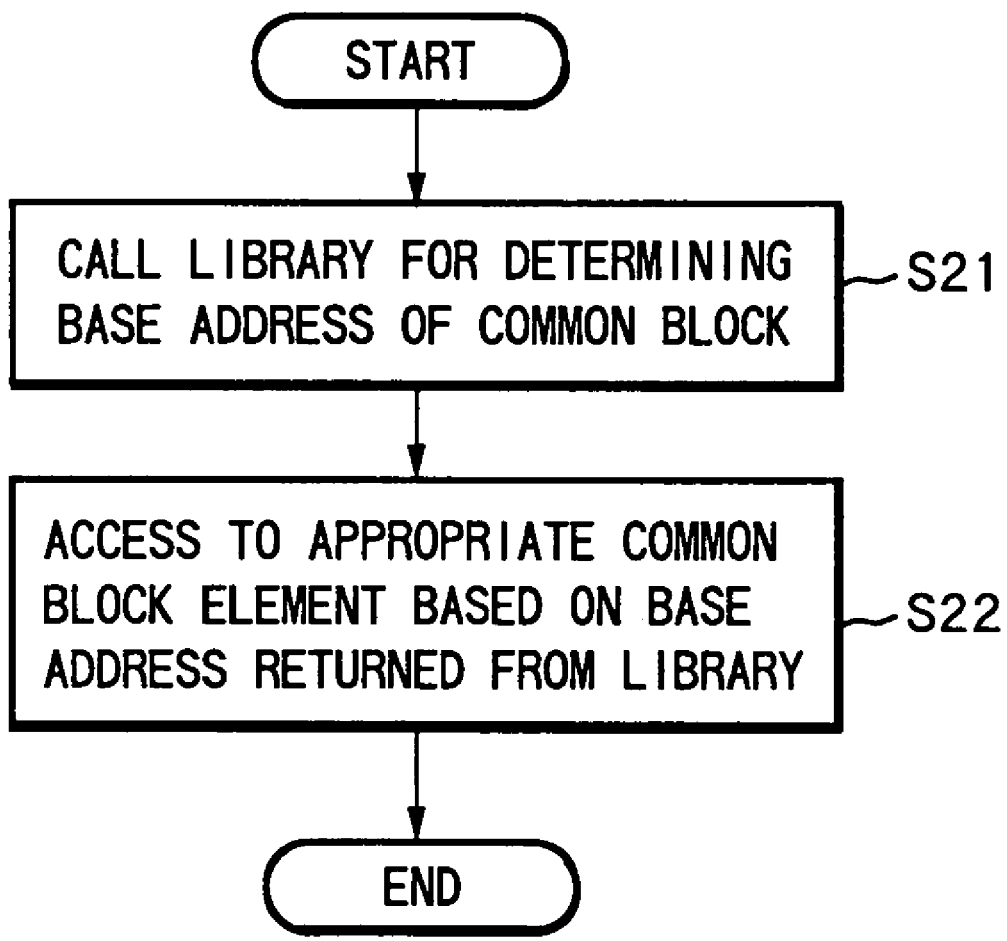
FIG. 4 is a flowchart showing processing contents when executing a code generated by the source analyzing part.

Firstly, FIG. 4 shows the processing contents by the code generated by the source analyzing part 12 of the compiler device 10.

At step 21, the library call generated at step 8 is executed at an entrance of a program for which the common block exists. In this way, the control is inherited to the library, and the base address of the common block is returned in accordance with the processing to be described later.

At step 22, the common block element is accessed based on the base address of the common block returned from the library.

Figure 5:
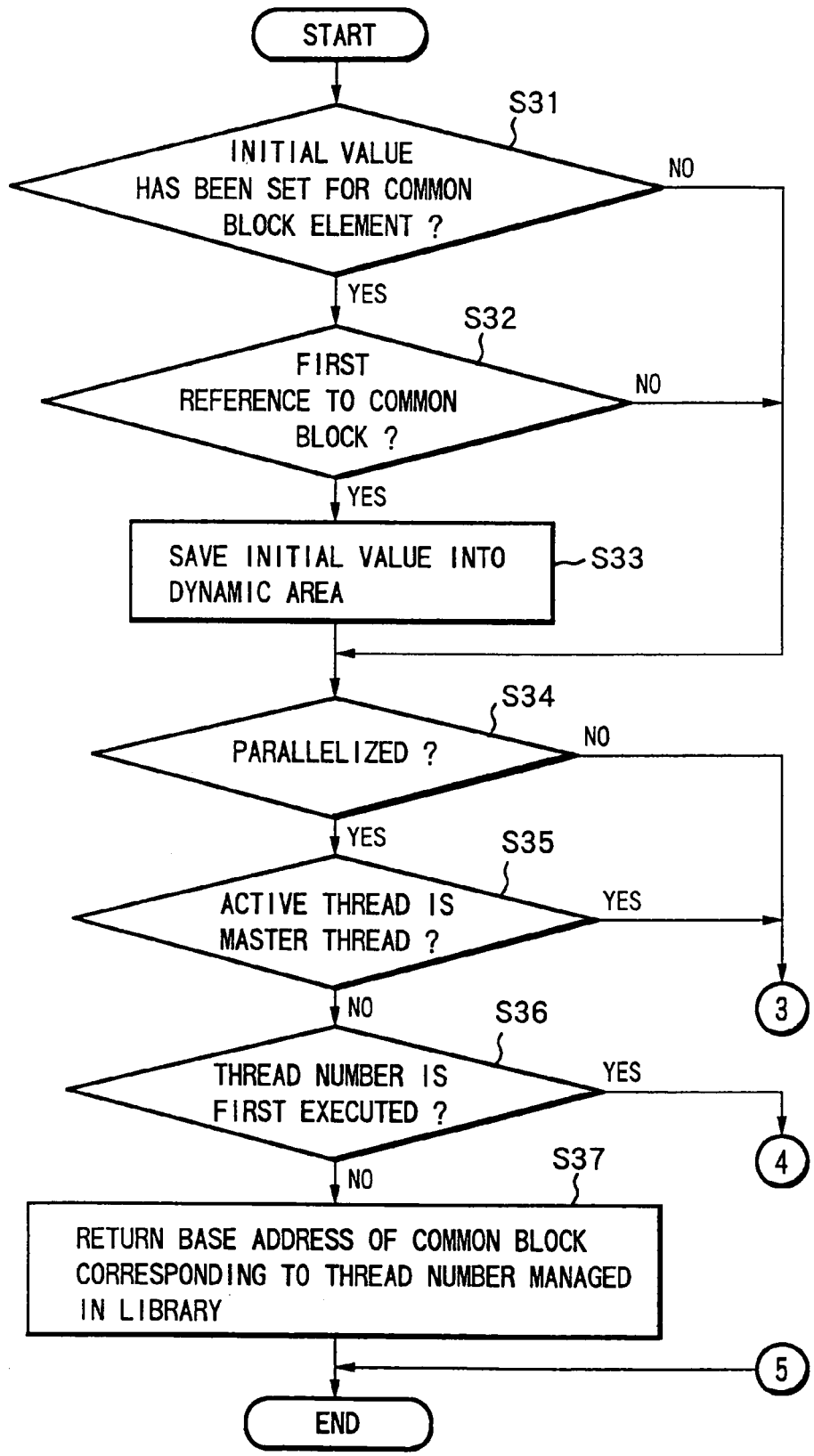
FIG. 5 is a flowchart showing processing contents in a library.
Figure 6:
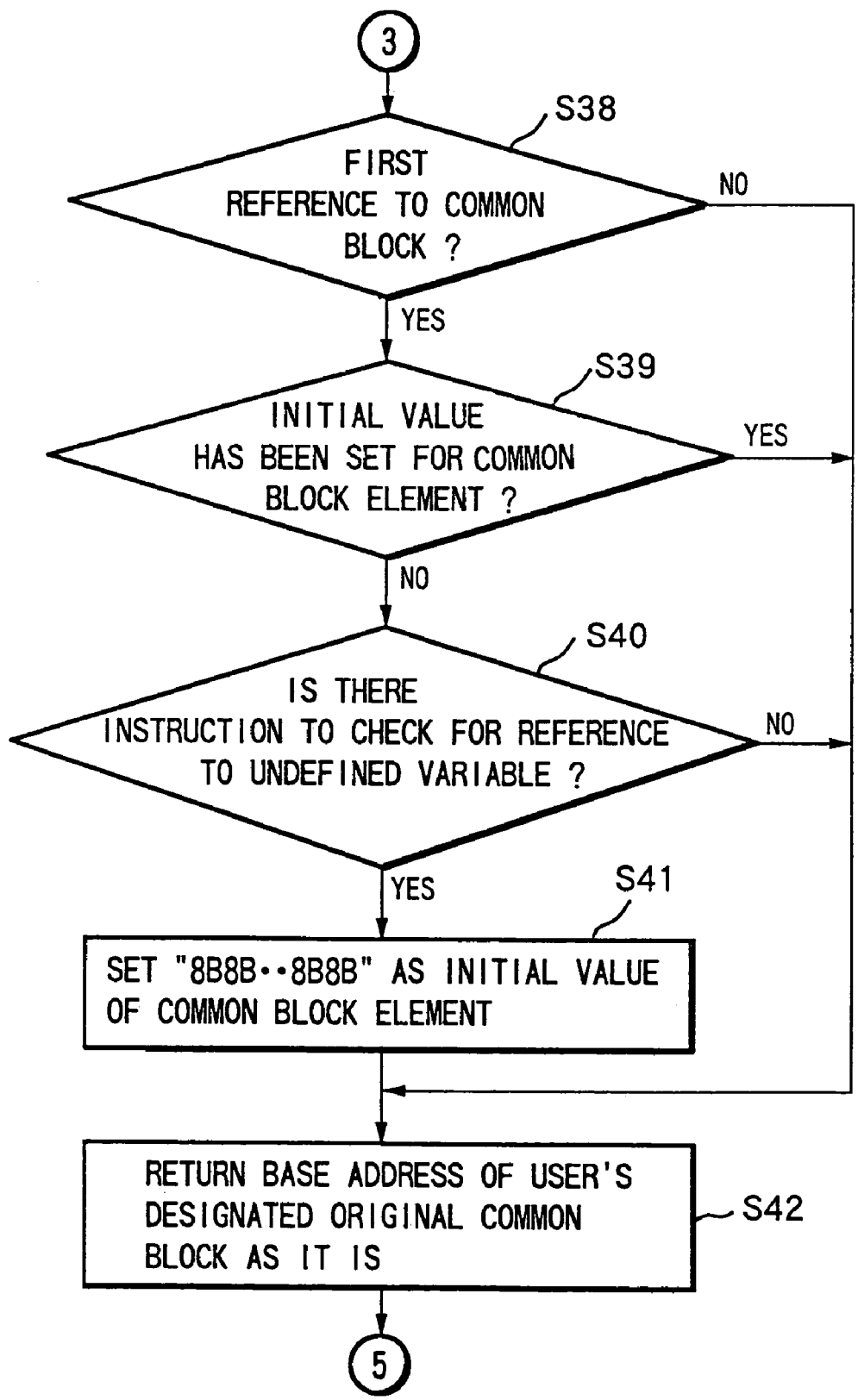
FIG. 6 is a continued flowchart showing the processing contents in the library.

Further, FIGS. 5 through 7 show the processing contents in the library.

At step 31, it is judged whether or not an initial value has been set for the common block element, based on the presence or absence of an identifier '###-Include initialized values-###' indicative of existence of an initial value. The flow advances to step 32 (Yes) if the initial value is set, while the flow advances to step 34 (No) if an initial value is not set.

At step 32, it is judged whether or not the reference to the common block is entirely new, based on the common block name referred to after execution of the program. The flow advances to step 33 (Yes) if the reference to the common block is entirely new, while the flow advances to step 34 (No) if the reference is not entirely new.

At step 33, there is dynamically allocated an area having a size the same as that of the common block, and the value (initial value) of the common block element is saved into the dynamically allocated area, so that the initial value of the common block element is not destroyed even if the user updates the value of the common block element.

According to the processing in steps 31 through 33 as described above, the initial value of the common block element is dynamically saved, if the initial value is set for the common block element and the reference to the common block is entirely new.

At step 34, it is judged whether or not the program is parallelized (multi-threaded). The flow advances to a step 35 (Yes) if it is parallelized, while the flow advances to step 38 (No) if it is not parallelized.

At step 35, it is judged whether or not the active thread is a master thread which is being executed by the CPU 0. The flow advances to step 38 (Yes) if such a condition is satisfied, and the flow advances to step 36 (No) if such a condition is not satisfied.

At step 36, it is judged whether or not the active thread is a parallelized thread other than the master thread, and a thread number for the common block is entirely new. The flow advances to step 43 (Yes) if such a condition is satisfied, while the flow advances to step 37 (No) if such a condition is not satisfied.

At step 37, it can be judged that the active thread is the parallelized thread other than the master thread and that the thread number for the common block has been set; thus, the base address of the common block for the thread number is returned. Here, the base address of the common block is specified, by retrieving the base address for the thread number managed in the library.

At step 38 for conducting a processing for a situation where the program is not parallelized, it is judged whether or not the reference to the common block is entirely new. The flow advances to step 39 (Yes) if the reference to the common block is entirely new, while the flow advances to step 42 (No) if the reference is not entirely new.

At step 39, it is judged whether or not an initial value is set for the common block element. The flow advances to step 42 (Yes) if the initial value is set, while the flow advances to step 40 (No) if an initial value is not set.

At step 40, it is judged whether or not there is an instruction to check for a reference to an undefined variable, based on the presence or absence of a library call for checking a reference to an undefined variable. The flow advances to step 41 (Yes) if there is the instruction to check for the reference, while the flow advances to step 42 (No) if there is not an instruction to check for a reference.

At step 41, as an initial value of the common block element, there is set an identifier (such as "8B8B• •8B8B") indicating that an initial value is unset.

At step 42, the base address of a user's designated original common block is returned as it is.

At step 43 for conducting a processing for a situation where the active thread is not a master thread and the thread number for the common block is entirely new, there is dynamically and newly allocated the common block area for the thread number.

At step 44, it is judged whether or not, based on the common block name, an initial value of the common block element corresponding to the common block name is saved. If the initial value is saved, the flow advances to step 45

(Yes) where the saved initial value is copied to the common block area. The flow advances to step 46 (No) if the initial value is not saved.

At step 46, it is judged whether or not there is an instruction to check for a reference to an undefined variable. If there is the instruction to check for a reference, the flow advances to step 47 (Yes) where, as an initial value of the common block element, there is set an identifier (such as "8B8B• •8B8B") indicating that an initial value is unset. Meanwhile, the flow advances to step 48 (No) if there is not an instruction to check for a reference.

At step 48, the common block area dynamically allocated at step 43 is managed in the library, by the thread number and the common block name.

At step 49, the base address of the dynamically allocated common block area is returned.

According to the processing at steps 34 through 49 as described above, the following processes are executed, depending on an execution state of a thread and on a condition referring to a common block, when a program has been parallelized.

(1) When an Active Thread is a Master Thread, and a Reference to a Common Block is Entirely New:

If there is established such a condition that an initial value is unset in the common block element and there is an instruction to check for a reference to an undefined variable, "8B8B• •8B8B" is set as an initial value of the common block element and then there is returned a base address of a user's designated original common block. Contrary, when such a condition is not established, the base address of the user's designated original common block is returned as it is.

(2) When an Active Thread is a Master Thread, and a Reference to a Common Block is not Entirely New:

The base address of the user's designated original common block is returned as it is.

(3) When an Active Thread is not a Master Thread, and a Thread Number for a Common Block is Entirely New:

If the common block area is dynamically allocated and an initial value is saved, the initial value is copied to the common block area. In this way, the setting of the initial value is dynamically performed for the dynamically allocated common block area. Meanwhile, if the initial value is not saved and there is an instruction to check for a reference to an undefined variable, "8B8B• •8B8B" is set as an initial value of the common block element. Thereafter, the dynamically allocated common block area is managed by the thread number and the common block name, and its base address is returned. By retrieving this managing information, it becomes possible to judge whether or the common block is entirely newly referred to, or to correlate the common block name with the thread number.

(4) When an Active Thread is not a Master Thread, and a Thread Number for the Common Block has Been Set:

There is returned the base address of the common block corresponding to the thread number managed in the library.

On the other hand, when the program is not parallelized, the following processing is executed.

If there is established such a condition that a reference to the common block is entirely new, an initial value is not set in the common block element, and there is an instruction to check for a reference to an undefined variable, "8B8B• •8B8B" is set as an initial value of the common block element and then there is returned the base address of the user's designated original common block. Contrary, when such a condition is not established, the base address of the user's designated original common block is returned.

Thus, upon compiling, a source program is converted into such a form in which a reference to the common block element is performed by using a base address of the common block returned by the library. In turn, when an active thread is a parallelized thread other than a master thread, there is returned a base address of a dynamically allocated common block area, from the library. Thus, it becomes possible in a program to access to the common block element based on a base address returned from the library, whether the common block area is dynamically allocated or not.

In this way, there is realized a procedure call utilizing an interface area in a parallel processing, to thereby allowing remarkable improvement of a processing performance of an application program.

The library for returning a base address of a common block may be either of a dynamic linked library to be dynamically called as required or a static library to be linked to an object program by a linker.

In the embodiment as described above, there is used the source program described in FORTRAN. However, the present invention can be of course applied to what is described in a language other than FORTRAN, such as C and C++.

When a program for realizing such a function is recorded into a computer-readable recording medium such as a magnetic tape, magnetic disk, magnetic drum, IC card and CD-ROM, the compiler program according to the present invention can be distributed into a market. Further, those who have obtained such a recording medium can easily constitute a compiler device according to the present invention.

We claim:

1. A compiler device to generate an object code corresponding to a plurality of procedures in a source program, said plurality of procedures using an interface area in common, said object code performing said plurality of procedures in parallel with a plurality of threads, one of said plurality of threads being a master thread and the others being non-master threads, said object code dynamically allocating private interface areas, different from said interface area in common, for said non-master threads, when said plurality of threads are processed in parallel.

2. A compiler device comprising:

code generating means for generating an object code corresponding to a plurality of procedures in a source program, said plurality of procedures using an interface area in common, said object code being performed in parallel with a plurality of threads, one of said plurality of threads being a master thread and the others being non-master threads, said object code determining leading addresses of private interface areas which being dynamically allocated for said non-master threads instead of the interface area used in common and allocated to said master thread, when at least one of said plurality of threads is processed; and code converting means for converting direct references to data in the interface area in the object code into indirect references to data in the private interface areas based on the leading addresses of the private interface areas.

3. A compiler device of claim 2, for determining the leading address of the interface area that is dynamically allocated for each thread.

4. A compiler device of claim 2, wherein said code generating means is constituted to generate a code for determining the leading address of the interface area designated by a user.

5. A computer-readable recording medium recorded with a compiler program for causing a computer to realize a function to generate an object code corresponding to a plurality of procedures in a source program, said plurality of procedures using an interface area in common, said object code being performed in parallel with a plurality of threads, one of said plurality of threads being a master thread and the others being non-master threads, said object code dynamically allocating private interface areas, different from said interface area in common, for said non-master threads, when said plurality of threads are executed.

6. A computer-readable recording medium recorded with a compiler program for causing a computer to realize:
- an object code generating function for generating an object code corresponding to a plurality of procedures in a source program, said plurality of procedures using an interface area in common, said object code being performed with a plurality of threads, one of said plurality of threads being a master thread and others being non-master threads, said object code determining leading addresses of private interface areas which are dynamically allocated for the non-master threads instead of the interface area used in common and allocated to said master thread, when one of the plurality of threads is processed; and
- a code converting function for converting direct references to data in the interface area in the object code into indirect references to data in the private interface areas based on the leading addresses of the private interfaces areas.

7. A computer-readable recording medium recorded with a compiler program of claim 6, wherein said code generating function is constituted to generate a code for calling a library for determining the leading address of the interface area that is dynamically allocated for each thread.

8. A computer-readable recording medium recorded with a compiler program of claim 6, wherein said code generating function is constituted to generate a code for determining the leading address of the interface area designated by a user.

9. A compiler device to generate an object code corresponding to a plurality of procedures in a source program, said plurality of procedures using an interface area in common, said object code performing said plurality of procedures in parallel with a plurality of threads, one of said plurality of threads being a master thread and the others being non-master threads, said object code dynamically allowing access to said interface area according to whether an active thread is said master thread, and whether common block information for said interface area is new, when said plurality of threads are processed in parallel.

* * * * *